US010190489B2

(12) United States Patent
Takamiya

(10) Patent No.: US 10,190,489 B2
(45) Date of Patent: Jan. 29, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Fumio Takamiya, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/477,596

(22) Filed: Apr. 3, 2017

(65) Prior Publication Data

US 2017/0284284 A1 Oct. 5, 2017

(30) Foreign Application Priority Data

Apr. 5, 2016 (JP) .................................. 2016-075958

(51) Int. Cl.
F02B 29/04 (2006.01)
F02B 39/00 (2006.01)

(52) U.S. Cl.
CPC ........ F02B 39/005 (2013.01); F02B 29/0443 (2013.01); F01P 2060/02 (2013.01); F01P 2060/12 (2013.01); F02B 29/04 (2013.01); F02B 29/0412 (2013.01); Y02T 10/146 (2013.01)

(58) Field of Classification Search
CPC .... F02B 39/005; F02B 29/0443; F02B 29/04; F02B 29/0412; F01P 2060/12; F01P 2060/02
See application file for complete search history.

(56) References Cited

U.S. PATENT DOCUMENTS

| 8,333,550 B2 * | 12/2012 | Fahl ........................ F01D 9/026 415/116 |
| 8,522,548 B2 | 9/2013 | Smiljanovski et al. |
| 2011/0253076 A1 * | 10/2011 | Mikame ................. F01P 3/202 123/41.31 |
| 2011/0302917 A1 * | 12/2011 | Styles ................... F02B 37/025 60/602 |

(Continued)

FOREIGN PATENT DOCUMENTS

| JP | 2005-163626 A | 6/2005 |
| JP | 2009-243277 A | 10/2009 |
| JP | 2012-132337 A | 7/2012 |

Primary Examiner — Jacob Amick
Assistant Examiner — Charles Brauch
(74) Attorney, Agent, or Firm — Hunton Andrews Kurth LLP

(57) ABSTRACT

In a turbine housing of a twin entry type turbocharger, a first scroll chamber communicating with a first exhaust manifold, and a second scroll chamber communicating with a second exhaust manifold are provided. A surface area of the first exhaust manifold is configured to be larger than a surface area of the second exhaust manifold, and these exhaust manifolds are cooled by a cooling mechanism. In the turbine housing, a first and second cooling water passages are respectively provided to cover the first and second scroll chambers. An internal combustion engine includes a cooling device that causes cooling water to flow into the first and second cooling water passages, and the cooling device is configured so that a temperature of the cooling water that is introduced into the second cooling water passage becomes lower than a temperature of cooling water that is introduced into the first cooling water passage.

2 Claims, 5 Drawing Sheets

(56) References Cited

U.S. PATENT DOCUMENTS

2012/0073528 A1\* 3/2012 Kim .................. B22D 15/02
                                                123/41.82 R
2012/0137993 A1\* 6/2012 Kim .................. F01P 7/165
                                                123/41.11

\* cited by examiner

INTERNAL COMBUSTION ENGINE

CROSS-REFERENCE TO RELATED APPLICATION

The present application claims priority to Japanese Patent Application No. 2016-075958 filed on Apr. 5, 2016, which is incorporated herein by reference in its entirety.

FIELD

The present disclosure relates to an internal combustion engine, and particularly relates to an internal combustion engine including a mechanism that cools a turbine housing of a twin entry type turbocharger.

BACKGROUND

Conventionally, Patent Literature 1, for example, discloses an art relating to an internal combustion engine including a twin entry type turbocharger. A twin entry type turbocharger includes two introduction ports for exhaust gas in the turbine, and an exhaust passage is configured so that exhaust gas of a first cylinder group out of a plurality of cylinders is caused to flow into one of the introduction ports of the turbine, and exhaust gas of a second cylinder group is caused to flow into the other introduction port of the turbine.

Further, the system of Patent Literature 1 described above includes two different cooling systems for cooling the exhaust gas that flows in exhaust ports. More specifically, the exhaust gas that flows in an exhaust port of the first cylinder group is cooled by a cooling system with a low water temperature, and the exhaust gas that flows in an exhaust port of the second cylinder group is cooled by a cooling system with a high water temperature.

Following is a list of patent literatures which the applicant has noticed as background of the present disclosure.
 Patent Literature 1: JP 2012-132337 A
 Patent Literature 2: JP 2005-163626 A
 Patent Literature 3: JP 2009-243277 A

SUMMARY

In the system of Patent Literature 1 described above, the exhaust gas which is recirculated as EGR gas can be switched between the exhaust gas of the first cylinder group and the exhaust gas of the second cylinder group, and therefore, the temperature of the EGR gas can be changed in accordance with the operation state of the internal combustion engine. However, in the system of Patent Literature 1 described above, exhaust gases with different temperatures are respectively introduced into a twin entry type turbocharger. The introduced exhaust gases flow in respective scroll chambers that are provided in a turbine housing. Consequently, when a temperature difference of the exhaust gases that flow in the respective scroll chambers is large, an excessive thermal stress is likely to occur to the turbine housing.

The present disclosure is made in the light of the problem as described above, and has an object to provide an internal combustion engine capable of restraining an excessive thermal stress from occurring to a turbine housing, in the internal combustion engine including a twin entry type turbocharger.

In one or more embodiments of the present disclosure, an internal combustion engine including a first exhaust manifold in which gas discharged from a first cylinder group of the internal combustion engine flows, a second exhaust manifold in which gas discharged from a second cylinder group that is different from the first cylinder group flows, and a turbocharger having a first scroll chamber that communicates with the first exhaust manifold and a second scroll chamber that communicates with the second exhaust manifold, in which a surface area of a wall surface of the first exhaust manifold is larger than a surface area of a wall surface of the second exhaust manifold. The turbocharger includes a turbine housing including the first scroll chamber and the second scroll chamber that are divided by a partition wall from each other in an axial direction of a turbine wheel, a first cooling water passage provided in the turbine housing to cover the first scroll chamber, and a second cooling water passage provided in the turbine housing to cover the second scroll chamber. The internal combustion engine includes a cooling device that causes cooling water to flow in the first cooling water passage and the second cooling water passage, and the cooling device is configured so that a temperature of cooling water that is introduced into the second cooling water passage becomes lower than a temperature of cooling water that is introduced into the first cooling water passage.

In one or more embodiments of the present disclosure, the first exhaust manifold and the second exhaust manifold are formed inside a cylinder head. The engine includes a cooling mechanism formed inside the cylinder head, and the cooling mechanism is configured to cause cooling water to flow in a water jacket provided around the first exhaust manifold and the second exhaust manifold.

In one or more embodiments of the present disclosure, the first cooling water passage and the second cooling water passage are connected in series, and the cooling device is configured by including a water pump that causes cooling water to flow from the second cooling water passage to the first cooling water passage.

In one or more embodiments of the present disclosure, the cooling device includes a first water pump that causes first cooling water to flow in the first cooling water passage, and a second water pump that causes second cooling water that has a lower temperature than the first cooling water to flow in the second cooling water passage.

In one or more embodiments of the present disclosure, the first cooling water is engine cooling water that passes through a main body of the internal combustion engine, and the second cooling water is cooling water that passes through a water-cooling type intercooler.

Since the exhaust gas flowing in the first exhaust manifold is cooled more than the exhaust gas flowing in the second exhaust manifold, exhaust gases with different temperatures are introduced into the first scroll chamber and the second scroll chamber in the turbine housing. According to one or more embodiments of the present disclosure, the cooling device is configured so that the temperature of the cooling water which is introduced into the second cooling water passage becomes lower than the temperature of the cooling water which is introduced into the first cooling water passage. According to the configuration like this, the region of the turbine housing at the side of the second cooling water passage is cooled more than the region of the turbine housing at the side of the first cooling water passage. Thereby, the turbine housing is cooled so as to reduce the temperature difference between the region at the side of the second scroll chamber and the region at the side of the first scroll chamber in the turbine housing, and therefore it becomes possible to restrain an excessive thermal stress from occurring to the turbine housing.

According to one or more embodiments of the present disclosure, the first exhaust manifold and the second exhaust manifold are formed inside the cylinder head, and the cooling mechanism is configured to cause the cooling water to flow in the water jacket provided around the first exhaust manifold and the second exhaust manifold. According to the configuration like this, the exhaust gas in the exhaust manifold can be cooled inside the cylinder head.

According to one or more embodiments of the present disclosure, the cooling water is caused to flow from the second cooling water passage that covers the second scroll chamber to the first cooling water passage that covers the first scroll chamber. According to the configuration like this, the cooling water after exchanging heat with the exhaust gas which flows in the second scroll chamber in the second cooling water passage is introduced into the first cooling water passage. Thereby, the temperature of the cooling water that is introduced into the second cooling water passage can be made relatively lower than the temperature of the cooling water that is introduced into the first cooling water passage, and therefore it becomes possible to restrain an excessive thermal stress from occurring to the turbine housing.

According to one or more embodiments of the present disclosure, the first cooling water is caused flow in the first cooling water passage, and the second cooling water having a lower temperature than the first cooling water is caused to flow in the second cooling water passage. Consequently, according to the present disclosure, the turbine housing is cooled so as to reduce the temperature difference between the region at the side of the second scroll chamber and the region at the side of the first scroll chamber in the turbine housing, and therefore it becomes possible to restrain an excessive thermal stress from occurring to the turbine housing.

According to one or more embodiments of the present disclosure, the cooling water that passes through the main body of the internal combustion engine is caused to flow in the first cooling water passage, and the cooling water that passes through the intercooler is caused to flow in the second cooling water passage. Consequently, according to the present disclosure, cooling waters with different temperatures can be caused to flow in the first cooling water passage and the second cooling water passage by using the existing cooling water.

DESCRIPTION OF EMBODIMENTS

Hereinafter, embodiments of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, structures and the like that are described in the embodiments shown as follows are not always indispensable to the present disclosure unless specially explicitly shown otherwise, or unless the disclosure is explicitly specified by the structures and the like theoretically.

Figure 1:
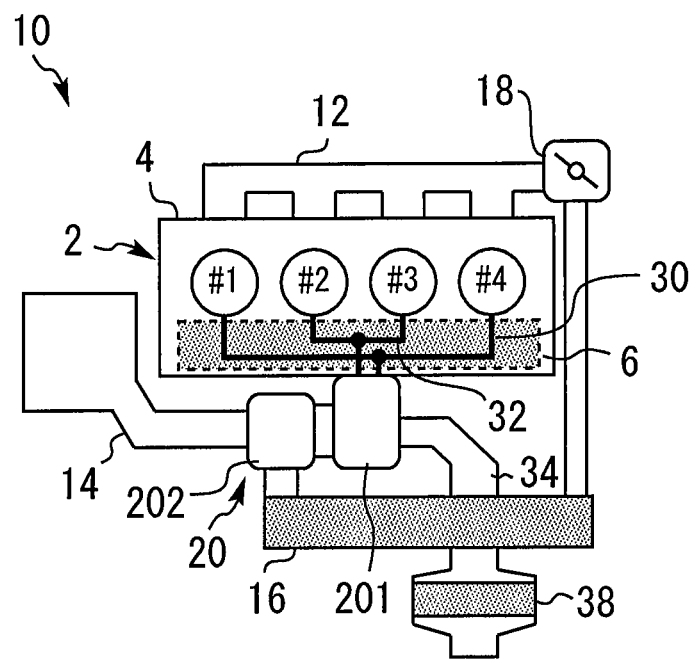
FIG. 1 is a simplified view for explaining a configuration of an internal combustion engine as one or more embodiments.

First Embodiment 1-1. Configuration of Internal Combustion Engine of First Embodiment FIG. 1 is a simplified view for explaining a configuration of an internal combustion engine as a first embodiment of the present disclosure. As illustrated in FIG. 1, an internal combustion engine 10 of the present embodiment is configured as an in-line four-cylinder engine that repeats explosion in sequence of #1 to #3 to #4 to #2. An intake passage 14 is connected to an engine main body 2 of the internal combustion engine 10 via an intake manifold 12, and an intercooler 16, a throttle valve 18 and the like are provided midway in the intake passage 14.

The internal combustion engine 10 is equipped with a turbocharger 20. The turbocharger 20 has a turbine 201 that is operated by energy of exhaust gas of the internal combustion engine 10, and a compressor 202 that is driven by the turbine 201. The intake passage 14 described above is connected to the compressor 202. By the compressor 202, intake air can be compressed.

The turbine 201 has two inlet ports. That is, the turbocharger 20 is configured as a twin entry type turbocharger. Details of an internal configuration of the turbocharger 20 will be described later. A first exhaust manifold 30 is connected to one of the inlet ports of the turbine 201, and a second exhaust manifold 32 is connected to the other inlet port. Details of configurations of the first exhaust manifold 30 and the second exhaust manifold 32 will be described later. An exhaust passage 34 is connected to an outlet port of the turbine 201. A catalyst 38 or the like that purifies exhaust gas is installed midway in the exhaust passage 34. According to the twin entry type turbocharger 20 like this, interference of exhaust pulsation among cylinders can be restrained, and excellent turbocharging characteristics can be obtained.

1-2. Configuration of Exhaust Manifold

Figure 2:
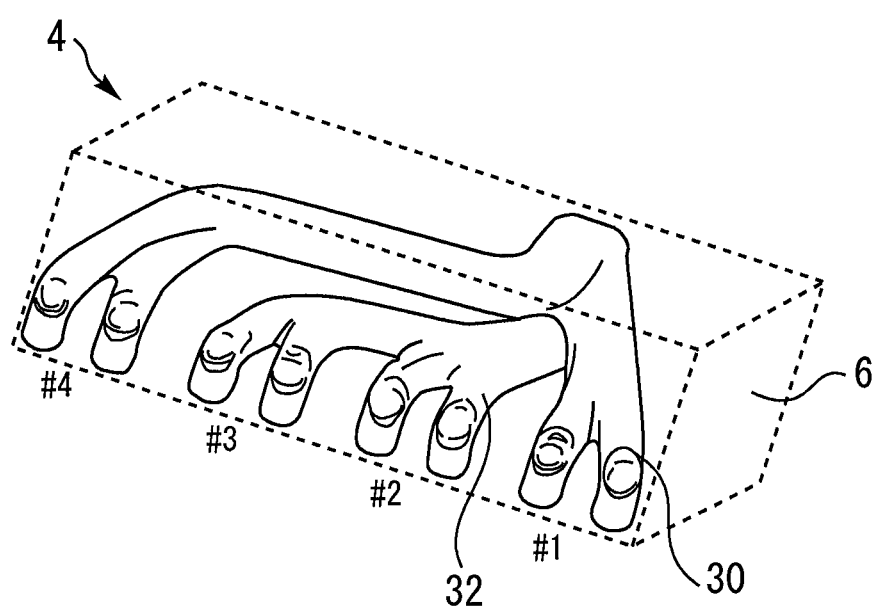
FIG. 2 is a view for explaining a configuration of an exhaust manifold provided in a cylinder head.

The first exhaust manifold 30 and the second exhaust manifold 32 are configured as a cylinder-head-integrated type exhaust manifold that is formed inside the cylinder head 4 of the internal combustion engine 10. FIG. 2 is a view for explaining a configuration of the exhaust manifold provided in the cylinder head. As illustrated in FIGS. 1 and 2, the first exhaust manifold 30 is connected to cylinder #1 and cylinder #4. That is, exhaust gas that is discharged from cylinder #1 and exhaust gas that is discharged from cylinder #4 join in the first exhaust manifold 30, and flow into the one of the inlet ports of the turbine 201. Hereinafter, a cylinder group configured by cylinder #1 and cylinder #4 will be referred to as "a first cylinder group".

Meanwhile, the second exhaust manifold 32 is connected to cylinder #2 and cylinder #3. That is, exhaust gas that is discharged from cylinder #2 and exhaust gas that is discharged from cylinder #3 join in the second exhaust manifold 32, and flow into the other inlet port of the turbine 201. Hereinafter, a cylinder group configured by cylinder #2 and cylinder #3 will be referred to as "a second cylinder group".

Further, the cylinder head 4 is equipped with an in-head water-cooling section 6 for cooling the exhaust gas that flows in the first exhaust manifold 30 and the exhaust gas that flows in the second exhaust manifold 32. The in-head water-cooling section 6 is configured to cause cooling water to flow through a water jacket that is provided around the first exhaust manifold 30 and the second exhaust manifold 32.

Note that as illustrated in FIG. 2, a passage length of the first exhaust manifold 30 is configured to be longer than a passage length of the second exhaust manifold 32. In the configuration like this, a surface area of a wall surface of the first exhaust manifold 30 is larger than a surface area of a wall surface of the second exhaust manifold 32. Consequently, a temperature of the exhaust gas that passes through the first exhaust manifold 30 is lower than a temperature of the exhaust gas that passes through the second exhaust manifold 32.

1-3. Configuration of Turbocharger

Figure 3:
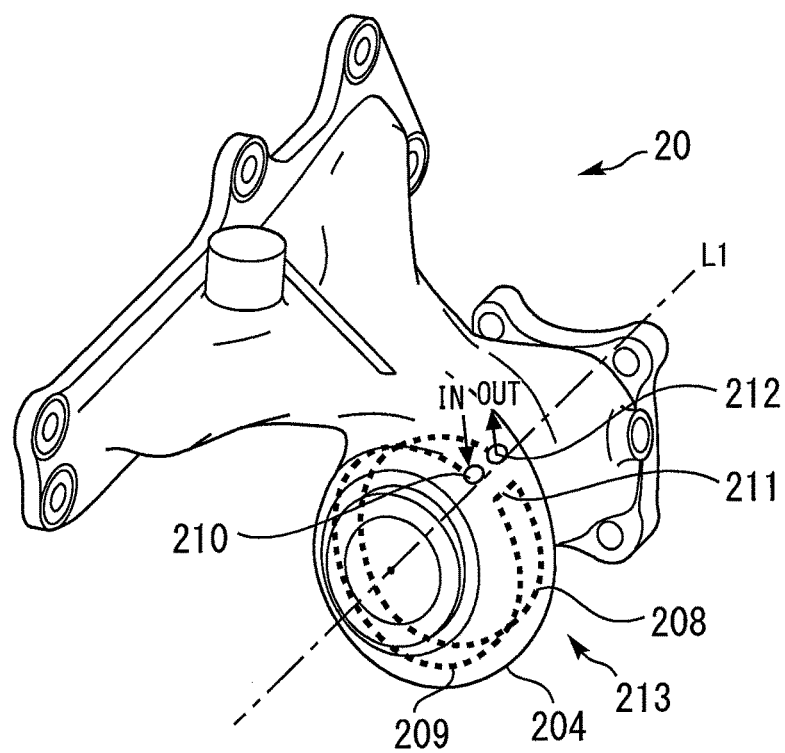
FIG. 3 is a view for explaining a configuration at a turbine side of a turbocharger of the first embodiment.
Figure 4:
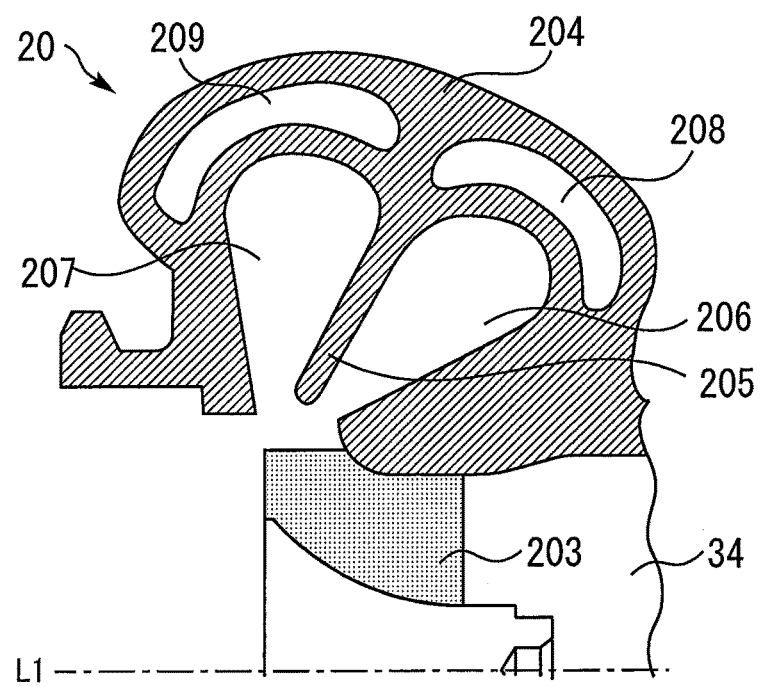
FIG. 4 is a view illustrating a part of a section in a case of cutting the turbine in FIG. 3 at a vertical plane passing through a rotation axis L1.

The twin entry type turbocharger 20 of the present embodiment includes a structure for preventing overheating of the turbine housing by causing the cooling water to flow inside the turbine housing. FIG. 3 is a view for explaining a configuration at a turbine side of the turbocharger in the first embodiment. Further, FIG. 4 is a view illustrating a part of a section in a case of cutting the turbine in FIG. 3 at a vertical plane passing through a rotation axis L1.

The turbocharger 20 includes a turbine wheel 203 that is disposed in the exhaust passage 34, a compressor impeller (not illustrated) that is disposed in the intake passage 14, and a connection shaft (not illustrated) that connects the turbine wheel 203 and the compressor impeller to be integrally rotatable, the turbine wheel 203 disposed in the exhaust passage 34 rotates by energy of the exhaust gas, and with this, the compressor impeller disposed in the intake passage 14 rotates. Subsequently, intake air is turbocharged by the rotation of the compressor impeller, and the turbocharged air is forcefully fed into combustion chambers of respective cylinders #1 to #4 of the internal combustion engine 10.

The turbine wheel 203 is accommodated in a turbine housing 204. A scroll chamber of the turbocharger 20 is divided into a first scroll chamber 206 and a second scroll chamber 207 that are arranged side by side in an axial direction of the rotation axis L1 by a partition wall 205. The first scroll chamber 206 and the second scroll chamber 207 are respectively provided with inlet ports (not illustrated) for exhaust gas. The first exhaust manifold 30 described above is connected to the inlet port of the first scroll chamber 206, and the second exhaust manifold 32 is connected to the inlet port of the second scroll chamber 207. That is, the first scroll chamber 206 communicates with the first exhaust manifold 30, and the second scroll chamber 207 communicates with the second exhaust manifold 32. Thereby, the exhaust gas of the first cylinder group is cooled by the in-head water-cooling section 6 in a process of flowing through the first exhaust manifold 30, and thereafter is introduced into the first scroll chamber 206 which is a communication destination. Meanwhile, the exhaust gas of the second cylinder group is cooled by the in-head water-cooling section 6 in a process of flowing through the second exhaust manifold 32, and thereafter is introduced into the second scroll chamber 207 that is a communication destination.

Further, in the turbine housing 204, cooling water passages are formed. In more detail, in the turbine housing 204, a first cooling water passage 208 and a second cooling water passage 209 are formed in such a manner as to cover outer circumferential sides of the first scroll chamber 206 and the second scroll chamber 207, respectively. At one end of the second cooling water passage 209, an inlet port 210 for the cooling water is provided. Further, to the other end of the second cooling water passage 209, one end of the first cooling water passage 208 is connected through a connection passage 211. Further, at the other end of the first cooling water passage 208, an outlet port 212 for the cooling water is provided. That is, the first cooling water passage 208 and the second cooling water passage 209 are connected in series. Thereby, a turbine cooling path 213 that extends from the inlet port 210 to the outlet port 212 through the second cooling water passage 209, the connection passage 211 and the first cooling water passage 208 is formed in the turbine housing 204.

1-4. Configuration of Cooling Device

Figure 5:
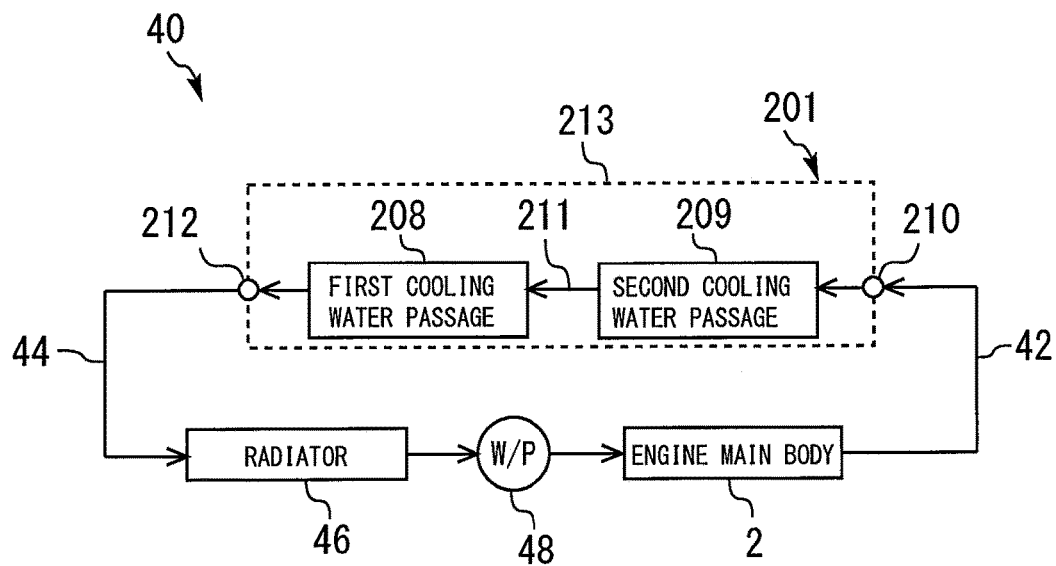
FIG. 5 is a diagram for explaining a system configuration of a cooling device of the first embodiment.

The internal combustion engine 10 includes a cooling device 40 for causing cooing water to flow through the turbine cooling path 213 that is formed in the turbine housing 204. FIG. 5 is a diagram for explaining a system configuration of the cooling device 40. As illustrated in FIG. 5, the cooling device 40 is configured as a device that causes engine cooling water to flow to the turbine cooling path 213. In more detail, a discharge port for the engine cooling water, of the engine main body 2 is connected to the inlet port 210 of the turbine cooling path 213 through a cooling water pipe 42. Further, the outlet port 212 of the turbine cooling path 213 is connected to an introduction port for the engine cooling water, of the engine main body 2 through a cooling water pipe 44. The cooling water pipe 44 is provided with a radiator 46 for cooling the engine cooling water, and a water pump 48 for feeding the engine cooling water to the engine main body 2.

When the water pump 48 is driven, the engine cooling water which is cooled in the radiator 46 is introduced into the engine main body 2. The engine cooling water introduced into the engine main body 2 is introduced into the turbine cooling path 213 after heat exchange with the engine main body 2. The engine cooling water that is introduced into the turbine cooling path 213 is used in cooling the turbine housing 204. The engine cooling water which is discharged from the turbine cooling path 213 is fed to the radiator 46 and is cooled, and thereafter is fed to the engine main body 2 again.

1-5. Feature of Internal Combustion Engine of First Embodiment

Next, a feature of the internal combustion engine of the first embodiment will be described. When the internal combustion engine 10 is driven, the exhaust gas discharged from the first cylinder group flows to the first exhaust manifold 30, and the exhaust gas discharged from the second cylinder group flows to the second exhaust manifold 32. The exhaust gas is cooled by the in-head water-cooling section 6 in the process of flowing through the respective exhaust manifolds. Since the surface area of the wall surface of the first exhaust manifold 30 is larger than the surface area of the wall surface of the second exhaust manifold 32 as described above, the temperature of the exhaust gas that passes through the first exhaust manifold 30 becomes lower than the temperature of the exhaust gas that passes through the second exhaust manifold 32.

The low-temperature exhaust gas passing through the first exhaust manifold 30 is introduced into the first scroll chamber 206 of the turbine 201. Meanwhile, the high-temperature exhaust gas passing through the second exhaust manifold 32 is introduced into the second scroll chamber 207 of the turbine 201.

When a temperature difference between the exhaust gas passing through the first scroll chamber 206 and the exhaust gas passing through the second scroll chamber 207 is large, a region at the side of the second scroll chamber 207 in the turbine housing 204 has a relatively higher temperature than the region at the side of the first scroll chamber 206, and an excessive thermal stress is likely to occur.

Thus, in the internal combustion engine 10 of the first embodiment, the turbine cooling path 213 is configured so that the engine cooling water passes from the second cooling water passage 209 to the first cooling water passage 208. The engine cooling water receives heat in the process of passing through the second cooling water passage 209 and the first cooling water passage 208, and therefore, the temperature of the engine cooling water passing through the second cooling water passage 209 becomes relatively lower than the temperature of the engine cooling water passing through the first cooling water passage 208. According to the configuration like this, the region of the turbine housing 204 at the side of the second scroll chamber 207 is cooled more preferentially than the region of the turbine housing 204 at the side of the first scroll chamber 206. Thereby, the turbine housing 204 can be cooled so as to reduce the temperature difference between the region at the side of the second scroll chamber 207 and the region at the first scroll chamber 206 in the turbine housing 204, and therefore it becomes possible to restrain an excessive thermal stress from occurring to the turbine housing 204.

Incidentally, in the internal combustion engine 10 of the aforementioned first embodiment, the case where the first exhaust manifold 30 and the second exhaust manifold 32 are cylinder-head-integrated type exhaust manifolds is described, but exhaust manifolds configured as separate bodies from the cylinder head 4 and a cooling mechanism that cools the exhaust manifolds may be used. This also applies to the internal combustion engine 10 of a second embodiment that will be described later.

Further, in the internal combustion engine 10 of the first embodiment 1 described above, the cooling device 40 that introduces the engine cooling water to the turbine cooling path 213 is described, but a configuration that introduces another kind of cooling water (intercooler cooling water that cools the intercooler, for example) to the turbine cooling path 213 may be adopted.

Further, in the internal combustion engine 10 of the embodiment 1 described above, the in-line four-cylinder engine is described as an example, but the engine to which the present disclosure is applicable is not limited to the in-line four-cylinder engine. That is, the present disclosure can be applied to various engines such as an in-line six-cylinder engine, a V type eight-cylinder engine, and a V type 12-cylinder engine, as long as the engine is an engine including a first exhaust manifold in which gas discharged from a first cylinder group flows, a second exhaust manifold in which gas discharged from a second cylinder group having the same number of cylinders as the number of cylinders of the first cylinder group flows, and a water-cooling section for cooling the two exhaust manifolds that are connected to a twin entry type turbocharger, wherein a difference occurs to the temperatures of the exhaust gases that are discharged from the respective exhaust manifolds because the surface areas (the path lengths) of the two exhaust manifolds differ from each other. Note that this also applies to the internal combustion engine 10 of the second embodiment that will be described later.

Note that in one or more embodiments, the in-head water-cooling section 6 corresponds to a "cooling mechanism", the first cooling water passage 208 corresponds to a first cooling water passage, and the second cooling water passage 209 corresponds to a second cooling water passage.

Second Embodiment 2-1. Internal Combustion Engine of Second Embodiment

An internal combustion engine of the second embodiment has a similar configuration to that of the internal combustion engine 10 of the first embodiment described above, except for the point that a configuration of a turbine cooling path in the turbocharger 20 and a configuration of a cooling device for cooling the turbine housing 204 in the turbocharger 20 are different.

2-2. Configuration of Turbocharger

Figure 6:
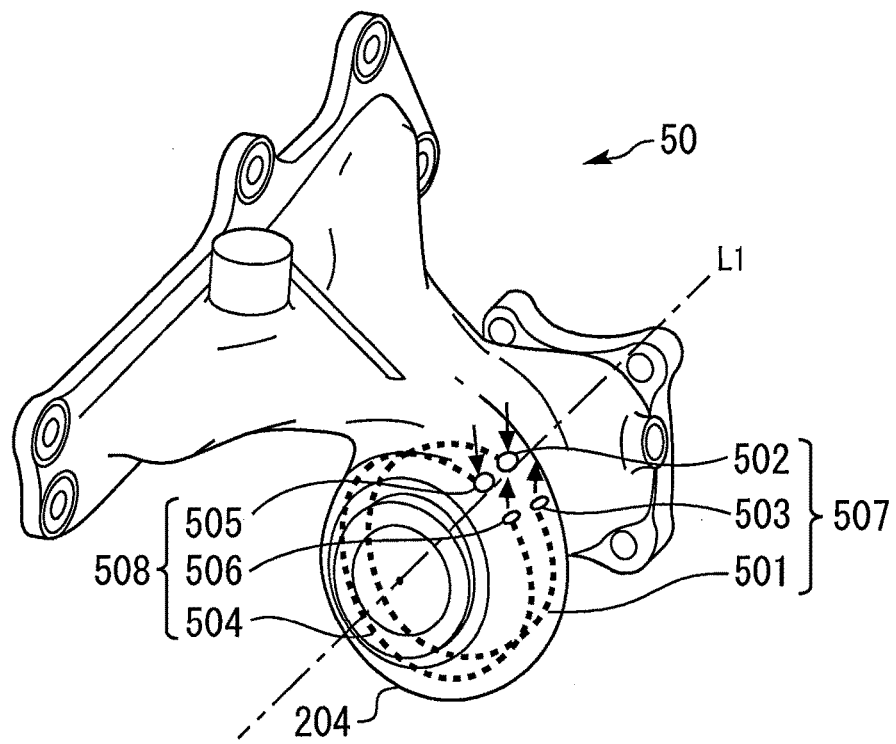
FIG. 6 is a view for explaining a configuration at a turbine side of a turbocharger of a second embodiment.
Figure 7:
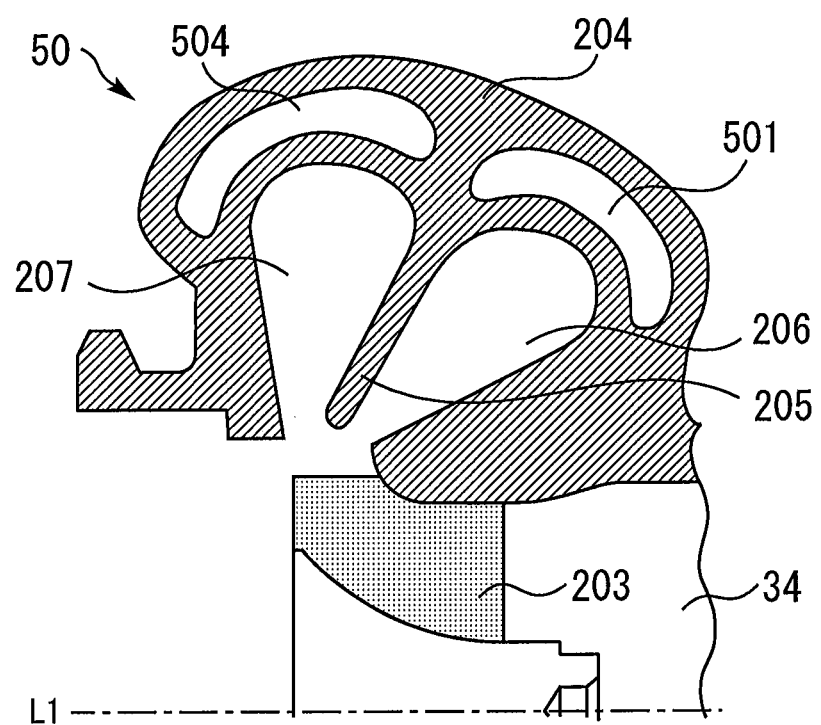
FIG. 7 is a view illustrating a part of a section in a case of cutting the turbine in FIG. 6 at a vertical plane passing through a rotation axis L1.

FIG. 6 is a view for explaining a configuration of a turbine side of a turbocharger 50 of the second embodiment. Further, FIG. 7 is a view illustrating a part of a section in a case of cutting the turbine in FIG. 6 at a vertical plane passing through the rotation axis L1. Note that in the turbocharger 50 illustrated in FIGS. 6 and 7, the components similar to the turbocharger 20 illustrated in FIGS. 3 and 4 will be assigned with the same reference signs, and explanation thereof will be omitted or simplified.

A cooling water passage is formed in the turbine housing 204 of the turbocharger 50. In more detail, in the turbine housing 204, a first cooling water passage 501 and a second cooling water passage 504 are formed to cover the outer circumferential sides of the first scroll chamber 206 and the second scroll chamber 207. An inlet port 502 for the cooling water is provided at one end of the first cooling water passage 501, and an outlet port 503 for the cooling water is provided at the other end. Further, an inlet port 505 for cooling water is provided at one end of the second cooling water passage 504, and an outlet port 506 for cooling water is provided at the other end. Thereby, a first turbine cooling path 507 that extends from the inlet port 502 to the outlet port 503 through the first cooling water passage 501, and a second turbine cooling path 508 that extends from the inlet port 505 to the outlet port 506 through the second cooling water passage 504 are formed in the turbine housing 204 as two turbine cooling paths.

2-3. Configuration of Cooling Device

Figure 8:
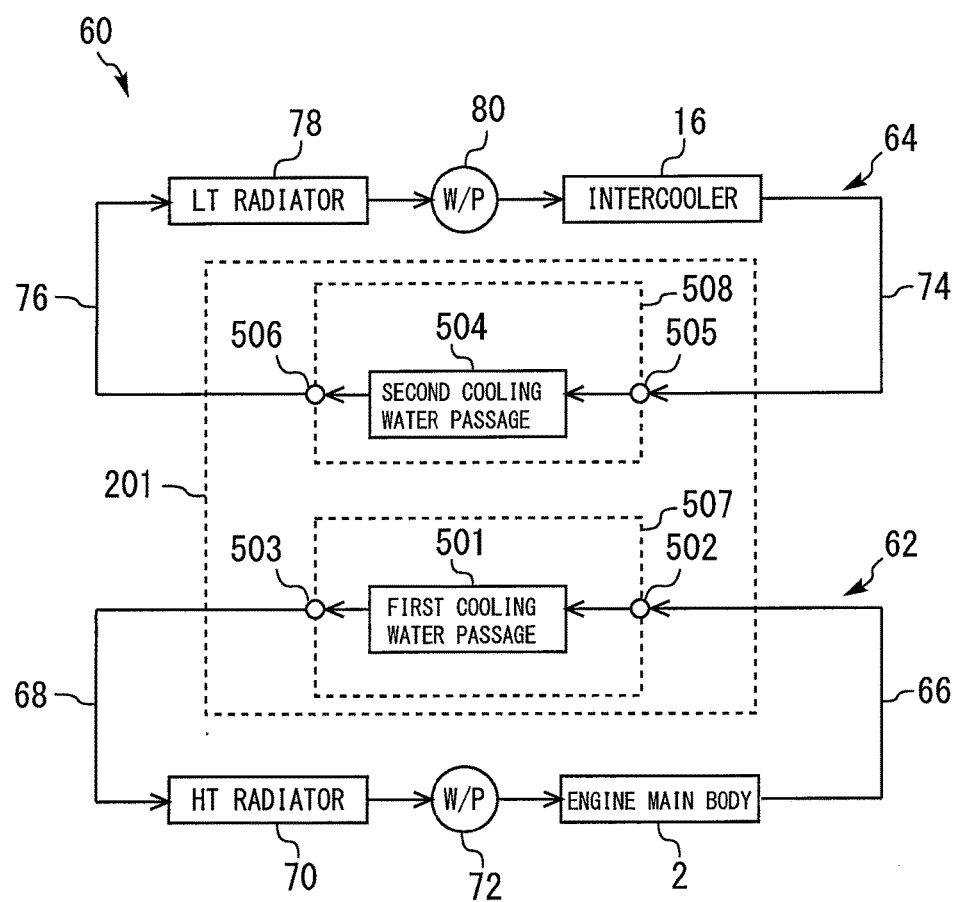
FIG. 8 is a diagram for explaining a system configuration of a cooling device of the second embodiment.

The internal combustion engine 10 includes a cooling device 60 for causing cooling water to pass through the first turbine cooling path 507 and the second turbine cooling path 508 that are formed in the turbine housing 204, respectively. FIG. 8 is a diagram for explaining a system configuration of the cooling device 60. As illustrated in FIG. 8, the cooling device 60 includes an HT cooling water circulation path 62 for cooling the engine main body 2 by using engine cooling water (hereinafter, HT cooling water), and an LT cooling water circulation path 64 for cooling the intercooler 16 by using cooling water (hereinafter, LT cooling water) having a lower temperature than the HT cooling water, as two cooling water circulation paths.

The first turbine cooling path 507 is provided midway in the HT cooling water circulation path 62. In more detail, a discharge port for the HT cooing water, of the engine main body 2 is connected to the inlet port 502 of the first turbine cooling path 507 through a cooling water pipe 66. Further, the outlet port 503 of the first turbine cooling path 507 is connected to an introduction port for the HT cooling water, of the engine main body 2 through a cooling water pipe 68. The cooling water pipe 68 is provided with an HT radiator 70 for cooling the HT cooling water, and a water pump 72 for feeding the HT cooling water to the engine main body 2.

When the water pump 72 is driven, the HT cooing water that is cooled in the HT radiator 70 is introduced into the engine main body 2. The HT cooling water introduced into the engine main body 2 is introduced into the first turbine cooling path 507 after heat exchange with the engine main body 2. The HT cooling water that is introduced into the first turbine cooling path 507 is used in cooling the turbine housing 204 in the process of flowing through the first cooling water passage 501. The HT cooling water that is discharged from the first turbine cooling path 507 is fed to the HT radiator 70 and cooled, and thereafter is fed to the engine main body 2 again.

Meanwhile, the second turbine cooling path 508 is provided midway in an LT cooling water circulation path 64. In more detail, a discharge port for the LT cooling water, of the intercooler 16 is connected to the inlet port 505 of the second turbine cooling path 508 through a cooling water pipe 74. Further, the outlet port 506 of the second turbine cooling path 508 is connected to an introduction port for the LT cooling water, of the intercooler 16 through a cooling water pipe 76. The cooling water pipe 76 is provided with an LT radiator 78 for cooling the LT cooling water, and a water pump 80 for feeding the LT cooling water to the intercooler 16.

When the water pump 80 is driven, the LT cooling water which is cooled in the LT radiator 78 is introduced into the intercooler 16. The LT cooling water introduced into the intercooler 16 is introduced into the second turbine cooling path 508 after heat exchange with the intercooler 16. The LT cooling water introduced into the second turbine cooling path 508 is used in cooling the turbine housing 204 in the process of flowing through the second cooling water passage 504. The LT cooling water discharged from the second turbine cooling path 508 is fed to the LT radiator 78 and cooled, and thereafter is fed to the intercooler 16 again.

2-4. Feature of Internal Combustion Engine of Second Embodiment

In the internal combustion engine 10 of the second embodiment, the first turbine cooling path 507 is configured so that the HT cooling water flows into the first cooling water passage 501, and the second turbine cooling path 508 is configured so that the LT cooling water flows into the second cooling water passage 504. According to the configuration like this, the region of the turbine housing 204 at the side of the second scroll chamber 207 is cooled more than the region of the turbine housing 204 at the side of the first scroll chamber 206. Thereby, the turbine housing 204 can be cooled so as to reduce the temperature difference between the region at the side of the second scroll chamber 207 and the region at the side of the first scroll chamber 206 in the turbine housing 204, and therefore, it becomes possible to restrain an excessive thermal stress from occurring to the turbine housing 204.

Incidentally, in the internal combustion engine 10 of the second embodiment described above, the cooling device 60 that uses the engine cooling water for use in cooling of the engine main body 2 as the HT cooling water, and uses the intercooler cooling water for use in cooling of the intercooler 16 as the LT cooling water is described. However, kinds of cooling water usable as the HT cooling water and the LT cooling water in the internal combustion engine 10 of the second embodiment are not limited to them, and two kinds of cooling water with different temperatures in a wide range can be used.

In one or more embodiments, the in-head water-cooling section 6 corresponds to a "cooling mechanism", and the HT cooling water corresponds to a "first cooling water". In one or more embodiments, the first cooling water passage 501 corresponds to a "first cooling water passage", and the water pump 72 corresponds to a "first water pump". In one or more embodiments, the second cooling water passage 504 corresponds to a "second cooling water passage", the LT cooling water corresponds to "second cooling water", and the water pump 80 corresponds to a "second water pump".

What is claimed is:

1. An internal combustion engine, comprising:
a first exhaust manifold in which gas discharged from a first cylinder group of the internal combustion engine flows;
a second exhaust manifold in which gas discharged from a second cylinder group that is different from the first cylinder group flows; and
a turbocharger having a first scroll chamber that communicates with the first exhaust manifold and a second scroll chamber that communicates with the second exhaust manifold,
in which a surface area of a wall surface of the first exhaust manifold is larger than a surface area of a wall surface of the second exhaust manifold,
wherein the turbocharger further comprises:
a turbine housing including the first scroll chamber and the second scroll chamber that are divided by a partition wall from each other in an axial direction of a turbine wheel,
a first cooling water passage provided in the turbine housing to cover the first scroll chamber and having an outlet, and
a second cooling water passage provided in the turbine housing to cover the second scroll chamber and having an inlet,
wherein the first cooling water passage and the second cooling water passage are connected in series so as to define a cooling water flow path within the turbine housing extending from the inlet to the outlet, and
the internal combustion engine comprises a water pump that causes the cooling water to flow from the second cooling water passage to the first cooling water passage.

2. The internal combustion engine according to claim 1, wherein the first exhaust manifold and the second exhaust manifold are formed inside a cylinder head, and
wherein the engine comprises a cooling mechanism formed inside the cylinder, and the cooling mechanism is configured to cause cooling water to flow in a water jacket provided around the first exhaust manifold and the second exhaust manifold.

* * * * *